(12) United States Patent
Tedjarati et al.

(10) Patent No.: US 12,394,998 B2
(45) Date of Patent: Aug. 19, 2025

(54) NONLINEAR POWER SOURCE CAPABILITY DETERMINATION

(71) Applicant: Joby Aero, Inc., Santa Cruz, CA (US)

(72) Inventors: Aria Tedjarati, Menlo Park, CA (US); Christos M. Bais, Keller, TX (US); Arpan Chakraborty, Santa Cruz, CA (US); Ruxiu Zhao, Campbell, CA (US); Paul T. Snow, Capitola, CA (US); Peter Wilson, Capitola, CA (US); Blake W. English, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 182 days.

(21) Appl. No.: 17/655,057

(22) Filed: Mar. 16, 2022

(65) Prior Publication Data

US 2023/0299601 A1 Sep. 21, 2023

(51) Int. Cl.
*H02J 7/00* (2006.01)
*B64D 41/00* (2006.01)
*H02J 1/10* (2006.01)

(52) U.S. Cl.
CPC ............ *H02J 7/0063* (2013.01); *B64D 41/00* (2013.01); *H02J 1/109* (2020.01); *H02J 7/00032* (2020.01); *H02J 7/0048* (2020.01); *B64D 2221/00* (2013.01); *H02J 2310/44* (2020.01)

(58) Field of Classification Search
CPC ...... H02J 7/0063; H02J 1/109; H02J 7/00032; H02J 7/0048; H02J 2310/44; B64D 41/00; B64D 2221/00
See application file for complete search history.

(56) References Cited

U.S. PATENT DOCUMENTS

| | | | |
|---|---|---|---|
| 6,909,261 B2 | 6/2005 | Laig-horstebrock et al. |
| 7,595,643 B2 | 9/2009 | Klang |
| 8,922,217 B2 | 12/2014 | Mao et al. |
| 9,321,368 B2 | 4/2016 | Yang et al. |
| 9,393,921 B1 | 7/2016 | Weicker et al. |
| 9,726,732 B2 | 8/2017 | Lin et al. |

(Continued)

FOREIGN PATENT DOCUMENTS

| | | |
|---|---|---|
| JP | 2022516074 | 2/2022 |
| JP | 2023138438 | 10/2023 |

(Continued)

OTHER PUBLICATIONS

"European Application Serial No. 23159682.6, Extended European Search Report mailed Aug. 14, 2023", 9 pgs.

(Continued)

*Primary Examiner* — Zhipeng Wang
(74) *Attorney, Agent, or Firm* — SCHWEGMAN LUNDBERG & WOESSNER, P.A.

(57) ABSTRACT

A method of determining the capability of a nonlinear aircraft power source includes accessing status values representing a current state of an energy storage system in an aircraft, accessing demand values related to expected power demands on the energy storage system, modeling an ongoing status of the energy storage system using the status values and the demand values to predict when one of the status values will reach a threshold value, and providing an output of a capability of the aircraft based on the status value reaching the threshold value.

20 Claims, 8 Drawing Sheets

(56) References Cited

U.S. PATENT DOCUMENTS

| | | | |
|---|---|---|---|
| 9,891,285 | B2 | 2/2018 | Prasad et al. |
| 10,094,882 | B2 | 10/2018 | Kawai et al. |
| 10,175,302 | B2 | 1/2019 | Zhong et al. |
| 10,175,303 | B2 | 1/2019 | Baba et al. |
| 10,664,562 | B2 | 5/2020 | Balasingam et al. |
| 11,119,157 | B2 | 9/2021 | Kim et al. |
| 11,218,005 | B2 * | 1/2022 | Winters .............. H01M 10/425 |
| 2011/0208453 | A1 | 8/2011 | Ci et al. |
| 2013/0069660 | A1 | 3/2013 | Bernard et al. |
| 2015/0219726 | A1 | 8/2015 | Lenz et al. |
| 2017/0072812 | A1* | 3/2017 | Von Novak ............ B64U 30/20 |
| 2017/0315179 | A1 | 11/2017 | Baba et al. |
| 2018/0246173 | A1 | 8/2018 | Singh et al. |
| 2019/0157885 | A1* | 5/2019 | Rippel .................... H02M 1/32 |
| 2019/0339334 | A1 | 11/2019 | Mikolajczak |
| 2020/0044461 | A1* | 2/2020 | Winters ................ H02J 7/0014 |
| 2020/0092052 | A1 | 3/2020 | Macafee et al. |
| 2020/0333805 | A1 | 10/2020 | English et al. |
| 2021/0070457 | A1* | 3/2021 | Wiegman ................ B64D 31/12 |
| 2021/0122466 | A1 | 4/2021 | Akers et al. |
| 2021/0309110 | A1* | 10/2021 | Wiegman ................ B60L 50/50 |
| 2021/0309392 | A1 | 10/2021 | Wiegman |
| 2021/0313804 | A1* | 10/2021 | Wiegman ................ H02J 1/109 |
| 2021/0364574 | A1 | 11/2021 | Wei et al. |
| 2023/0152380 | A1 | 5/2023 | Liu et al. |

FOREIGN PATENT DOCUMENTS

| | | |
|---|---|---|
| KR | 20210052354 | 5/2021 |
| WO | 2013016188 | 1/2013 |

OTHER PUBLICATIONS

"Japanese Application Serial No. 2023-039631, Notification of Reasons for Refusal mailed Feb. 6, 2024", w English Translation, 8 pgs.

"European Application Serial No. 23159682.6, Communication Pursuant to Article 69 EPC mailed Sep. 25, 2023", 2 pgs.

"European Application Serial No. 23159682.6, Response filed Mar. 15, 2024 to Communication Pursuant to Article 69 EPC mailed Sep. 25, 2023", 16 pgs.

"Japanese Application Serial No. 2023-039631, Examiners Decision of Final Refusal mailed Jul. 30, 2024", w English translation, 4 pgs.

"Japanese Application Serial No. 2023-039631, Response Filed May 2, 2024 to Notification of Reasons for Refusal mailed Feb. 6, 2024", W English Claims, 10 pgs.

"Korean Application Serial No. 10-2023-0034526, Notice of Preliminary Rejection mailed Aug. 7, 2024", w English translation, 12 pgs.

* cited by examiner

NONLINEAR POWER SOURCE CAPABILITY DETERMINATION

TECHNICAL FIELD

This invention relates generally to the aviation field, and more specifically to the determination and presentation of the capabilities of a power source such as a rechargeable battery pack.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
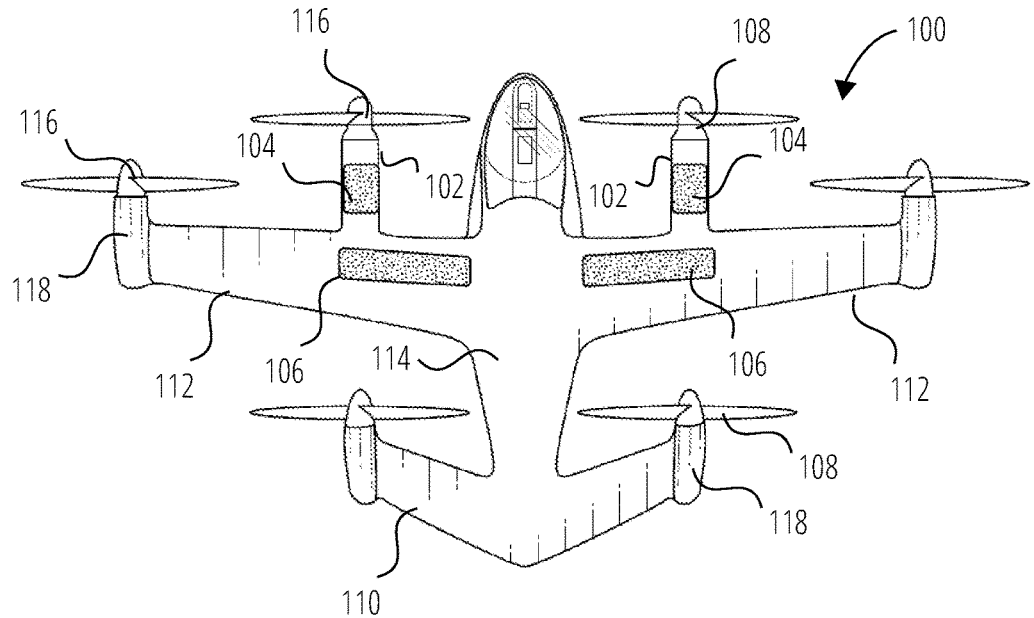
FIG. 1 is a plan view of a VTOL aircraft according to some examples.

The following description of examples of the invention is not intended to limit the invention to these examples, but rather to enable any person skilled in the art to make and use this invention.

In a conventional aircraft that use avgas or jet fuel, the remaining flight time is directly related to the remaining capacity of the fuel tanks and the current fuel consumption rate. If the pilot adjusts the throttle to a new power or thrust level, there will be an associated new fuel consumption rate that can be used to determine the remaining available flight time at that power or thrust level, by dividing the remaining fuel capacity by the new fuel consumption rate. In the case of nonlinear power sources, the remaining flight time or range may not depend solely on a combination of the current power demand and the remaining capacity of the power source.

For example, an increased power draw on a battery pack may cause the temperature or voltage of the battery to reach an undesirable level before the capacity of the battery has been exhausted. For vehicles on the ground or on water, battery management systems can manage the power draw to avoid temperature or voltage limits from being reached in this manner, but this approach may not be applicable in the aviation context, where providing a certain power level may be required to ensure safe operation of the aircraft or to make sure that it can reach an appropriate landing site. Similar considerations can apply in aircraft having hybrid or hydrogen-based power sources.

In some examples, provided is a method executed by one or more processors that includes accessing status values representing a current state of an energy storage system in an aircraft (including an available energy level), accessing demand values related to expected power demands on the energy storage system, executing a dynamic model to compute an ongoing status of the energy storage system using the status values and the demand values to predict when one of the status values, other than the available energy level, will reach a threshold value, and providing an output of a capability of the aircraft based on the status value reaching the threshold value. The demand values may be based in part on a type of flight including forward flight and vertical flight. The demand values may also be related to a flight plan including a takeoff, a flight path and a landing.

Execution of the dynamic model may be done iteratively to determine a sequence of predicted status values representing predicted states of the energy storage system based on the expected power demands on the energy storage system. In some examples, execution of the dynamic model is done iteratively to determine when one of a temperature value or a voltage level reaches a threshold level.

In some examples, a second dynamic model may be executed to compute a second ongoing status of the energy storage system using the status values and alternative demand values to predict when one of the status values will reach a threshold value, and an output of an alternative capability of the aircraft based on the status value reaching the threshold value based on the alternative demand values. The alternative demand value may be based on hovering of the aircraft or on a power level that will provide an approximate maximum range.

The alternative demand value may also be based on a loss of a capability of the aircraft. The energy storage system may include a plurality of energy storage modules and the loss of the capability of the aircraft may be a loss of power from one of the energy storage modules. The aircraft may also include a plurality of thrust-generating modules, and the loss of the capability of the aircraft may be a loss of thrust from one of the thrust-generating modules.

In some examples, provided is a computer system including one or more processors and a memory storing instructions that, when executed by the one or more processors, configure the system to perform operations corresponding to any of the methods and limitations described above, including but not limited to accessing status values representing a current state of an energy storage system in an aircraft, including an available energy level, accessing demand values related to expected power demands on the energy storage system, executing a dynamic model to compute an ongoing status of the energy storage system using the status values and the demand values to predict when one of the status values, other than the available energy level, will reach a threshold value, and providing an output of a capability of the aircraft based on the status value reaching the threshold value.

In some examples, provided is a non-transitory computer-readable storage medium, the computer-readable storage medium including instructions that when executed by one or more processors, cause the processors to perform operations corresponding to any of the methods and limitations described above, including but not limited to accessing status values representing a current state of an energy storage system in an aircraft, including an available energy level, accessing demand values related to expected power demands on the energy storage system, executing a dynamic model to compute an ongoing status of the energy storage system using the status values and the demand values to predict when one of the status values, other than the available energy level, will reach a threshold value, and providing an output of a capability of the aircraft based on the status value reaching the threshold value Other technical features may be readily apparent to one skilled in the art from the following figures, descriptions, and claims.

FIG. 1 is a plan view of a VTOL aircraft 100 according to some examples. The aircraft 100 includes a fuselage 114, two wings 112, an empennage 110 and propulsion systems 108 embodied as tiltable rotor assemblies 116 located in nacelles 118. The aircraft 100 includes one or more a nonlinear power sources embodied in FIG. 1 as nacelle battery packs 104 and wing battery packs 106. In the illustrated example, the nacelle battery packs 104 are located in inboard nacelles 102, but it will be appreciated that the nacelle battery packs 104 could be located in other nacelles 118 forming part of the aircraft 100. The aircraft 100 will typically include associated equipment such as an electronic infrastructure, control surfaces, a cooling system, landing gear and so forth.

The wings 112 function to generate lift to support the aircraft 100 during forward flight. The wings 112 can additionally or alternately function to structurally support the battery packs 202, battery module 204 and/or propulsion systems 108 under the influence of various structural stresses (e.g., aerodynamic forces, gravitational forces, propulsive forces, external point loads, distributed loads, and/or body forces, and so forth).

Figure 2:
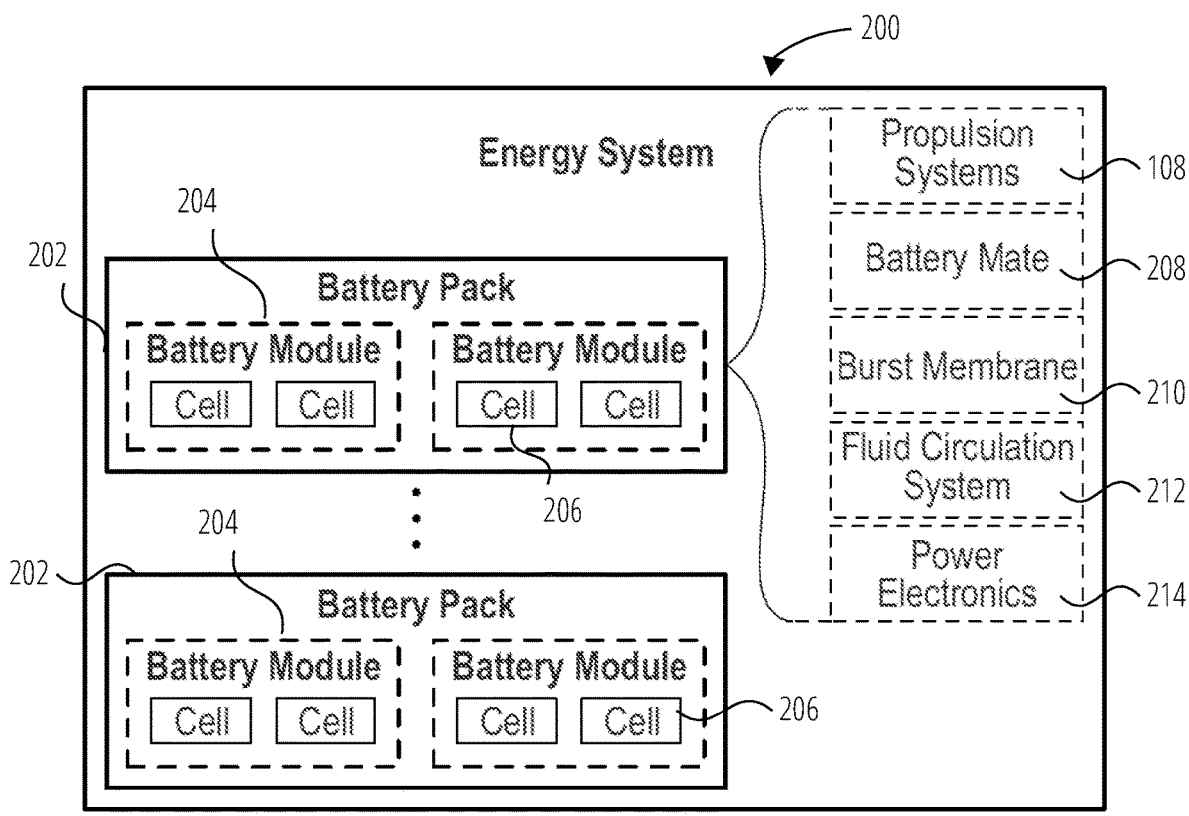
FIG. 2 is a schematic view of an aircraft energy storage system according to some examples.

FIG. 2 is a schematic view of an aircraft energy storage system 200 according to some examples. As shown, the energy storage system 200 includes one or more battery packs 202. Each battery pack 202 may include one or more battery modules 204, which in turn may comprise a number of cells 206.

Typically associated with a battery pack 202 are one or more propulsion systems 108, a battery mate 208 for connecting it to the energy storage system 200, a burst membrane 210 as part of a venting system, a fluid circulation system 212 for cooling, and power electronics 214 for regulating delivery of electrical power (from the battery during operation and to the battery during charging) and to provide integration of the battery pack 202 with the electronic infrastructure of the energy storage system 200. As discussed in more detail below, the propulsion systems 108 may comprise a plurality of rotor assemblies.

The electronic infrastructure and the power electronics 214 can additionally or alternatively function to integrate the battery packs 202 into the energy storage system 200 of the aircraft. The electronic infrastructure can include a Battery Management System (BMS), power electronics (HV architecture, power components, and so forth), LV architecture (e.g., vehicle wire harness, data connections, and so forth), and/or any other suitable components. The electronic infrastructure can include inter-module electrical connections, which can transmit power and/or data between battery packs and/or modules. Inter-modules can include bulkhead connections, bus bars, wire harnessing, and/or any other suitable components.

The battery packs 202 function to store electrochemical energy in a rechargeable manner for supply to the propulsion systems 108. Battery packs 202 can be arranged and/or distributed about the aircraft in any suitable manner. Battery packs can be arranged within wings (e.g., inside of an airfoil cavity), inside nacelles, and/or in any other suitable location on the aircraft. In a specific example, the system includes a first battery pack within an inboard portion of a left wing and a second battery pack within an inboard portion of a right wing. In a second specific example, the system includes a first battery pack within an inboard nacelle of a left wing and a second battery pack within an inboard nacelle of a right wing. Battery packs 202 may include a plurality of battery modules 204.

The energy storage system 200 can optionally include a cooling system (e.g., fluid circulation system 212) that functions to circulate a working fluid within the battery pack 202 to remove heat generated by the battery pack 202 during operation or charging. Battery cells 206, battery module 204 and/or battery packs 202 can be fluidly connected by the cooling system in series and/or parallel in any suitable manner.

Figure 3:
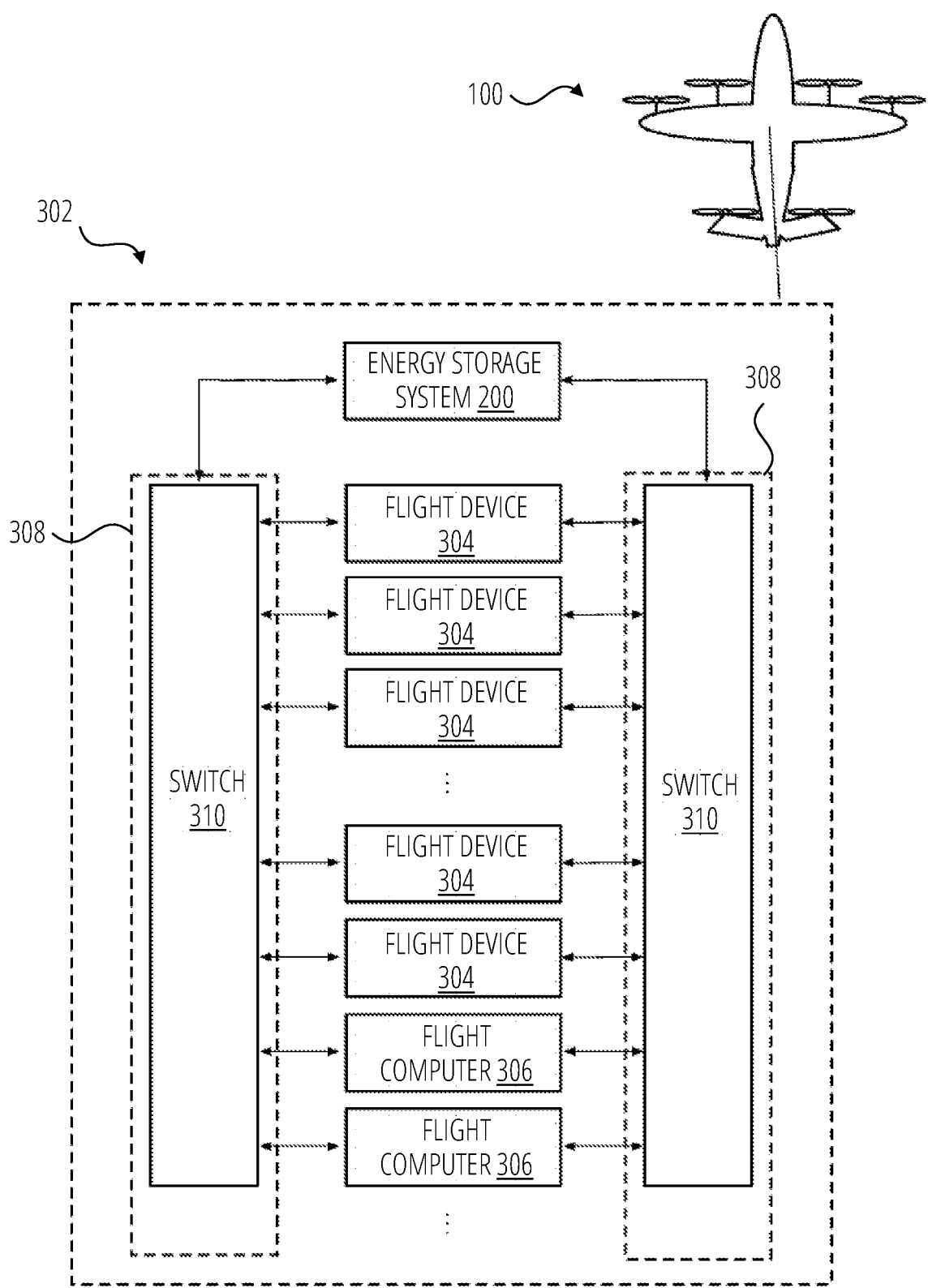
FIG. 3 illustrates an electrical architecture for the aircraft of FIG. 1 according to some examples.

FIG. 3 illustrates an electrical architecture 302 for the aircraft 100 of FIG. 1. The electrical architecture 302 includes the energy storage system 200, a plurality of flight devices 304, a plurality of flight computer 306, and a distribution network 308. Network 308 includes a number of switches 310 and appropriate wired or wireless data-transmission links within the network 308 and with the other components of the electrical architecture 302.

The electrical architecture 302 functions to provide redundant and fault-tolerant power and data connections between the flight device 304, flight computer 306 and the energy storage system 200. The flight devices 304 can include any components related to aircraft flight, including for example actuators and control surfaces, such as ailerons, flaps, rudder fins, landing gear, sensors (e.g., kinematics sensors, such as IMUs; optical sensors, such as cameras; acoustic sensors, such as microphones and radar; temperature sensors; altimeters; pressure sensors; and/or any other suitable sensor), cabin systems, and so forth.

The flight computers 306 control the overall functioning of the aircraft 100, including by interpreting and transforming flight data into commands that can be transmitted to and interpreted by controllable flight components. Data may be commands, aircraft state information, and/or any other appropriate data. Aircraft state information may include faults (fault indicator, fault status, fault status information, etc.); sensor readings or information collected by flight components such as speed, altitude, pressure, GPS information, acceleration, user control inputs (e.g., from a pilot or operator), measured motor RPM, radar, images, or other sensor data; component status (e.g., motor controller outputs, sensor status, on/off, etc.), energy storage system 200 state information (battery pack 202 voltage, level of charge, temperature and so forth); and/or any other appropriate information. Commands may include faults (fault indicator, fault status, fault status information, etc.); control commands (e.g., commanding rotor RPM (or other related parameter such as torque, power, thrust, lift, etc.), data to be stored, commanding a wireless transmission, commanding display output, etc.); and/or any other appropriate information.

Included with the flight computers 306 are I/O components 942 (see FIG. 9) used to receive input from and provide output to a pilot or other operator. I/O components 942 may for example include a joystick, inceptor or other flight control input device, data entry devices such as keyboards and touch-input devices, and one or more display screens for providing flight and other information to the pilot or other operator.

One or more of the flight computers 306 also perform the methods described below for determining the capabilities of the energy storage system 200, based on data received from the I/O components 942, data entered by the pilot, data retrieved from one or more remote servers such as the data repository 410 described below, as well as aircraft and battery state information.

Figure 4:
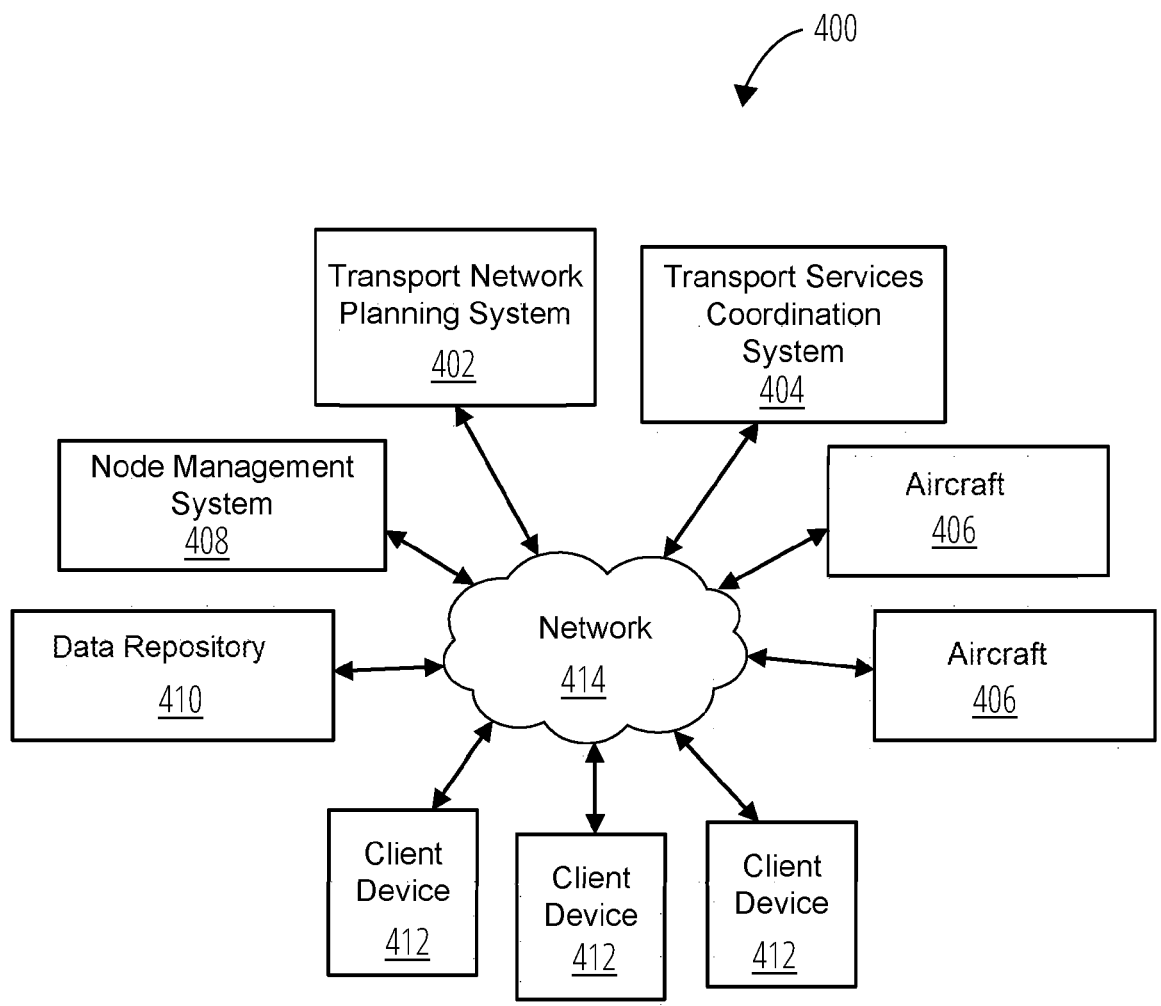
FIG. 4 illustrates a computing environment associated with an aviation transport network according to some examples.

FIG. 4 illustrates a computing environment 400 associated with an aviation transport network according to some examples. In the example shown in FIG. 4, the computing environment 400 includes a transport network planning system 402, a transport services coordination system 404, a set of aircraft 406, a node management system 408 and a set of client devices 412 all connected via a network 308. In other examples, the computing environment 400 contains different and/or additional elements. In addition, the functions may be distributed among the elements in a different manner than described. For example, the node management systems 408 may be omitted, with information about the nodes stored and updated at the transport network planning system 402

The transport network planning system 402 assists in the planning and design of the transport network. In some examples, the transport network planning system 402 estimates demand for transport services, suggests locations for transportation nodes to help meet that demand, and simulates the flow of riders and aircraft 406 between the nodes to assist in network planning.

The transport services coordination system 404 coordinates transport services once a set of transportation nodes are operational. The transport services coordination system 404 pairs users who request transport services (riders) with specific aircraft 406. The transport services coordination system 404 may also interact with ground-based transportation to coordinate travel services. For example, the transport services coordination system 404 may be an extension of an existing transport services coordinator, such as a ridesharing service.

The aircraft 406 are vehicles that fly between nodes in the transport network. An aircraft 406 may be controlled by a human pilot (inside the vehicle or on the ground) or it may be autonomous. In some examples the aircraft 406 is an aircraft 100. For convenience, the various components of the computing environment 400 will be described with reference to this example. However, other types of aircraft may be used, such as helicopters, planes that take-off at angles other than vertical, and the like.

An aircraft 406 may include an electrical architecture 302 that communicates status information (e.g., via the network 414) to other elements of the computing environment 400. The status information may include current location, current battery charge, potential component failures, and the like. The electrical architecture 302 of the aircraft 406 may also receive information, such as routing information, weather information, and energy availability at nodes where the aircraft is scheduled to be, or currently is, located (e.g., a number of kilowatts that may be drawn from the power grid at a node).

A node management system 408 provides functionality at a node in the transport network. A node is a location at which aircraft are intended to land and take-off. Within a transport network, there may be different types of nodes. For example, a node in a central location with a large amount of rider throughput might include sufficient infrastructure for sixteen (or more) aircraft 406 to simultaneously (or almost simultaneously) take off or land. Similarly, such a node might include multiple charging stations for recharging battery-powered aircraft 406. In contrast, a node located in a sparsely populated suburb might include infrastructure for a single aircraft 406 and have no charging station. The node management system 408 may be located at the node or remotely and be connected via the network 414. In the latter case, a single node management system 408 may serve multiple nodes.

In some examples, a node management system 408 monitors the status of equipment at the node and reports to the transport network planning system 402. For example, if there is a fault in a charging station, the node management system 408 may automatically report that it is unavailable for charging aircraft 406 and request maintenance or a replacement. The node management system 408 may also control equipment at the node. For example, in some examples, a node includes one or more launch pads that may move from a take-off/landing position to embarking/disembarking position. The node management system 408 may control the movement of the launch pad (e.g., in response to instructions received from transport services coordination system 404 and/or an aircraft 406).

The client devices 412 are computing devices with which users may arrange transport services within the transport network. In some examples, the client devices 412 are mobile devices (e.g., smartphones, tablets, and so forth) running an application for arranging transport services. A user provides a pickup location and destination within the application and the client device 412 sends a request for transport services to the transport services coordination system 404. Alternatively, the user may provide a destination and the pickup location is determined based on the user's current location (e.g., as determined from GPS data for the client device 412).

Regardless of how they are generated, the transport services coordination system 404 determines how to service transport requests. In some examples, a transport request can be serviced by a combination of ground-based and aerial transportation. The transport services coordination system 404 sends information about how the request will be serviced to the user's client device (e.g., what vehicle the user should get into, directions on where to walk, if necessary, and so forth).

The data repository 410 includes one or more servers that may or may not be hosted by the provider of the aviation transport network. The data repository 410 provides information that can be used by the other components of the computing environment 400, such as weather information at the nodes (barometric pressure, dew point, air temperature, wind direction), geographical information about nodes (elevation, longitude/latitude and so forth) that can be used by the transport network planning system 402 or the aircraft 406 for trip planning and for use in determining the capabilities of the energy storage system 200 as described in more detail below. In some examples the data repository 410 can be a weather service provider, a provider of mapping or other geographic information, and so forth. The data repository 410 may also be hosted as part of, or distributed between, other components of the computing environment 400, such as the transport services coordination system 404 and the node management system 408.

The network 414 provides the communication channels via which the other elements of the networked computing environment 400 communicate. The network 414 can include any combination of local area and/or wide area networks, using both wired and/or wireless communication systems.

Figure 5:
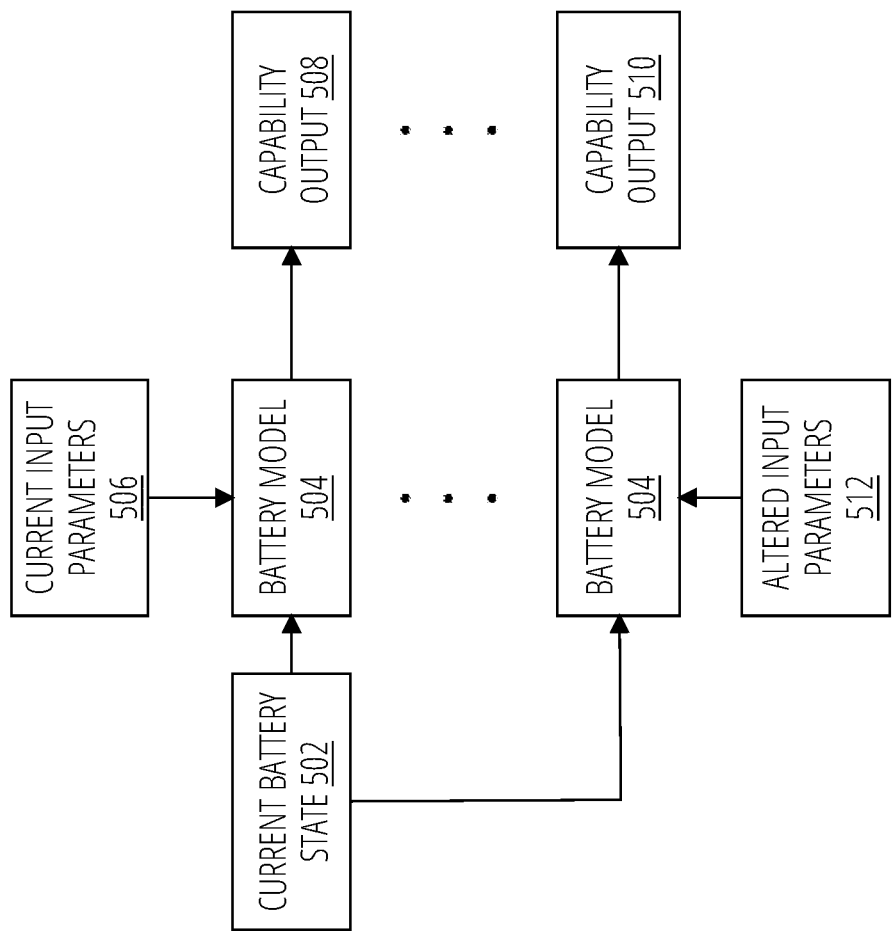
FIG. 5 illustrates a schematic diagram of the modeling of the capabilities of the energy storage system of FIG. 2 under different scenarios, according to some examples.

FIG. 5 illustrates a schematic diagram of the modeling of the capabilities of the energy storage system 200 under different scenarios, according to some examples. The modeling is performed by one or more of the flight computers 306 in conjunction with, and based on data and inputs received from, the flight devices 304 and related sensors, as well as flight mission parameters and environmental conditions. As can be seen, the flight computers 306 include a number of battery models 504, which receive inputs including an initial or current battery state 502 as well as relevant input parameters, such as current input parameters 506 and altered input parameters 512. Based on the current battery state 502 and the input parameters, the battery models 504 determine a battery capability, which is then provided as an output, for example capability output 508 or capability output 510.

The battery model 504 is a multidimensional dynamic model that can determine a predicted battery state at a future time based on the current battery state 502 (including for example current battery temperature, current remaining battery capacity, current battery voltage) and a power demand on the battery. The power demand on the battery is either a current (actual) power demand value or a predicted or assumed power demand value based on an expected flight plan or one or more alternative scenarios.

An example of a dynamic model of a system includes computer code that when executed computes changes in the system's states or statuses over time. A dynamic model of an energy storage system can correspond to computer code that defines a set of dynamical equations that represents a model of the energy storage system's behavior or battery states over time, based on an initial state of the battery storage system and certain input parameters to the energy storage system.

For example, if the aircraft 100 is flying at a steady airspeed with no change in altitude at time t(n), consuming W(n) kW of power at a temperature of X(n) deg. C, with a remaining battery capacity of Y(n) % (or kWh), and a battery voltage of Z(n) volts, the battery model 504 can determine that at time t(n+1) the battery will have a predicted status including a temperature of X(n+1) deg. C, a remaining battery capacity of Y(n+1)% (or kWh), and a battery voltage of Z(n+1) volts. The predicted battery status and any updated power demand value at time t (n+1) can then be provided to the battery model 504 to determine an updated battery status at time t(n+2).

For any particular mission profile, a predicted or expected power draw can be determined from parameters of the aircraft 100 (such as weight), parameters at the origin and destination (such as altitude, outside air temperature), in-flight parameters (such as current or intended cruising altitude, cruising speed and wind direction), and operational parameters such as the intended type of takeoff and landing (such as vertical, short or conventional), taxi time and so forth.

Based on the expected power draw, the current battery state 502 and the current input parameters 506, the battery model 504 can step through the expected power draw throughout the intended mission profile to determine battery states throughout the intended mission profile and provide a capability output 508, for example a range or available time of flight for the aircraft 100 if it follows the intended mission profile. The battery model thus uses repeated forward-propagated simulations of the battery usage in order to determine an estimate of how long the energy storage system 200 can be used under the current or proposed conditions.

The capability output will provide for sufficient remaining battery capability at the end of the indicated range so that the aircraft 100 can descend and perform the intended landing at the destination. That is, for some range determinations, the battery model 504 will iterate the expected power draw through a final segment of the mission profile until an estimated maximum range for an intermediate segment has been determined.

As illustrated by the ellipses in FIG. 5, a number of battery models 504 can be utilized to provide different capability outputs 510 based on a number of different scenarios represented by different groups of altered input parameters 512.

In some cases, emergency scenarios might be modeled, such as the loss of thrust from one of the propulsion systems 108 or the loss of power from a battery pack 202 or one or more battery modules 204 in the energy storage system 200. For example, if the energy storage system 200 includes four battery packs 202 and one of the battery packs 202 is no longer able to supply energy and assuming no change in flight mode or airspeed, the demand on the other battery packs 202 may increase by approximately 33% to compensate for the loss of capacity. Similarly, a loss of thrust from one of the propulsion systems 108 will demand an increase in thrust from the remaining propulsion systems 108 assuming no change in flight mode or airspeed. An increase in demand by the remaining propulsion systems 108 may create an additional power demand on one or more of the battery packs 202 due to how the battery packs 202 are connected to the different propulsion systems 108. The increased power delivery demands on one or more of the battery packs 202 resulting from the emergency situation will affect how long it takes the energy storage system 200 to reach a critical temperature or voltage threshold.

The aircraft 100 is a dynamic system and the actual power draw in an emergency scenario will depend on a number of factors, including the flight mode and any actions taken by the pilot or instructed by the flight computers 306 of the aircraft 100 itself. For example, where the aircraft 100 is in forward flight, the loss of power from a battery pack 202 may result in slower commanded airspeed, and therefore result in a reduction of the demand on the other operable battery packs 202 from the modeled emergency scenario power draw, which would in turn result in an increased actual capability compared to the modeled capability output 510.

In some cases, automatic adjustments in response to an emergency situation may be included in the determination of the modeled capability output 510. However, to provide a conservative indication of the capabilities of the aircraft 100 in an emergency scenario, the modeled capability output 510 may be based on a maximum expected or possible power draw in the hypothetical emergency situation. In the event of an actual emergency situation, the current circumstances and any steps taken to address the emergency situation will be provided to the flight computers 306 as part of the current input parameters 506, which, together with the current battery state 502, will then allow the battery model 504 to provide a real time capability output 508 as before.

To provide a clear indication of the capabilities of the energy storage system 200 under emergency circumstances, and under the assumption that the planned landing at the destination may not take place, the capability output 510 may in some examples be a representation of range or flight time based on a particular flight configuration, for example, how much hover time is available if the emergency situation occurred under current conditions.

Other scenarios that will be modeled include a nominal range or duration, and a best endurance ("BE") range or duration. The nominal range or duration is based on the power draw for all aircraft systems working nominally, and may be expressed as a total range for horizontal flight and an available hovering time. The best endurance range or duration is based on a known and published airspeed for the aircraft that results in the theoretical best endurance.

Figure 6:
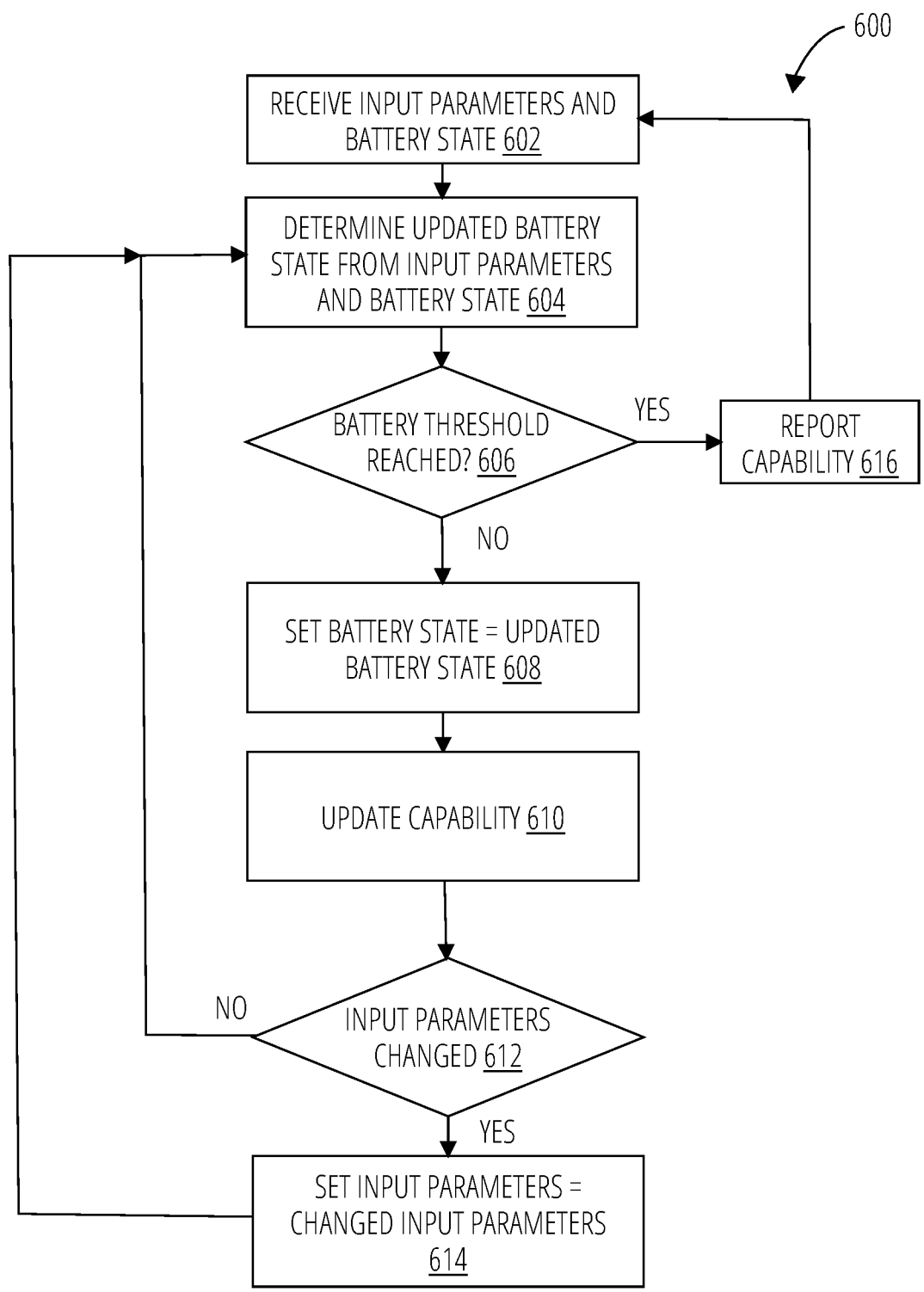
FIG. 6 illustrates a flowchart for determining the capability of a nonlinear power source, according to some examples.

FIG. 6 illustrates a flowchart 600 for determining the capability of a nonlinear power source, according to some examples. For explanatory purposes, the operations of the flowchart 600 are described herein as occurring in serial, or linearly. However, multiple operations of the flowchart 600 may occur in parallel. In addition, the operations of the flowchart 600 need not be performed in the order shown and/or one or more blocks of the flowchart 600 need not be performed and/or can be replaced by other operations. Also, the operations of the flowchart 600 will typically execute on one or more of the flight computers 306, although some or all of the operations may execute on other computer processors that may be present locally or be accessed over the network 414, such as at node management system 408 or at the transport services coordination system 404.

The flowchart 600 commences at operation 602 with access of or receipt by a flight computer 306 of the input parameters and the current battery state 502. As discussed above, the input parameters include (but are not limited to) parameters of the aircraft 100 (such as weight), parameters at the origin and destination (such as altitude, outside air temperature), in-flight parameters (such as current or intended cruising altitude, cruising speed, wind direction, outside air temperature, mode of flight), and operational parameters such as the intended type of takeoff and landing (such as vertical, short or conventional), taxi time and so forth.

The battery state (including for example current battery temperature, current remaining battery capacity, current battery voltage) is obtained from the energy storage system 200. Also provided or derived for use as an input parameter is a power demand on the battery, which is either a current (actual) power demand value in operation of the aircraft 100, or a predicted or assumed power demand value based on an expected flight plan or one or more alternative scenarios.

In operation 602, the flight computer determines an updated battery state using a battery model 504 and based on the input parameters and the battery state. The updated battery state is a determined as a forward-propagated simulation of the battery usage based on the parameters, at some increment of time in the future, which is short enough for changes in the battery state to be essentially linear and predictable.

The flight computer 306 then determines in operation 606 whether any one of the battery parameters (battery temperature, battery voltage, battery capacity) of the updated battery state has reached a threshold value. If none of the relevant battery parameters in the updated battery state has reached a threshold in operation 606, then the battery state for the next iteration of the method is set to the updated battery state in operation 608.

The capability of the energy storage system 200 is updated in operation 610. For example, if the time increment used in the forward simulation of the battery state is 5 s, then for a determination of hovering capability, five seconds is added to a cumulative total of hover time from the initial battery state. Similarly, for a determination of range, a distance equal to 5 s multiplied by the actual or intended ground speed is added to a cumulative total of the range from the initial battery state.

The flight computer 306 then determines in operation 614 whether or not the input parameters have changed (or will change at this time in the flight). For example, for a particular flight plan at a particular moment, the aircraft 100 may transition from horizontal flight to vertical flight in order to land. In such a case the mode of flight will change at this point in the forward simulation from a horizontal flight mode to a vertical flight mode. In some cases, and depending on what capability is being determined, a change in an input parameter might require a restart of the method. So, for example, if a total range or flight time is being determined for a current power level, and the power level is increased by the pilot, then any in-process value of the range or flight time is no longer valid and the flowchart 600 will restart at operation 602 to determine the battery capability with the new power level.

If the input parameters have not changed in operation 612, then the flowchart 600 returns to operation 604 and continues from there. If the input parameters have changed in operation 612 then the input parameters for use in operation 604 are updated in operation 614, and the flowchart 600 continues at operation 604. The operations in the loop of flowchart 600 from operation 604 to operation 612/operation 614 continue to be performed by the flight computer 306 until a battery threshold is reached in operation 606. At that time, the cumulative capability (such as range or flight time) determined in the flowchart 600 is reported in operation 616 via one or more of the I/O components 942, such as on a display screen as will be described below.

Since the aircraft 100 in operation is a dynamic system, and since conditions are likely to be changing constantly, including the actual state of the battery, the operations of the flowchart 600 will repeat or restart with a new current battery state and any new input conditions as time passes and the flight progresses.

As mentioned above, a number of battery models 504 will be run simultaneously by one or more of the flight computers 306 for different scenarios, including a range and flight time for the current flight plan, for range at the current power level, for best endurance range, for available hover time, for critical loss of thrust ("CLT"), hover time, and so forth.

Figure 7:
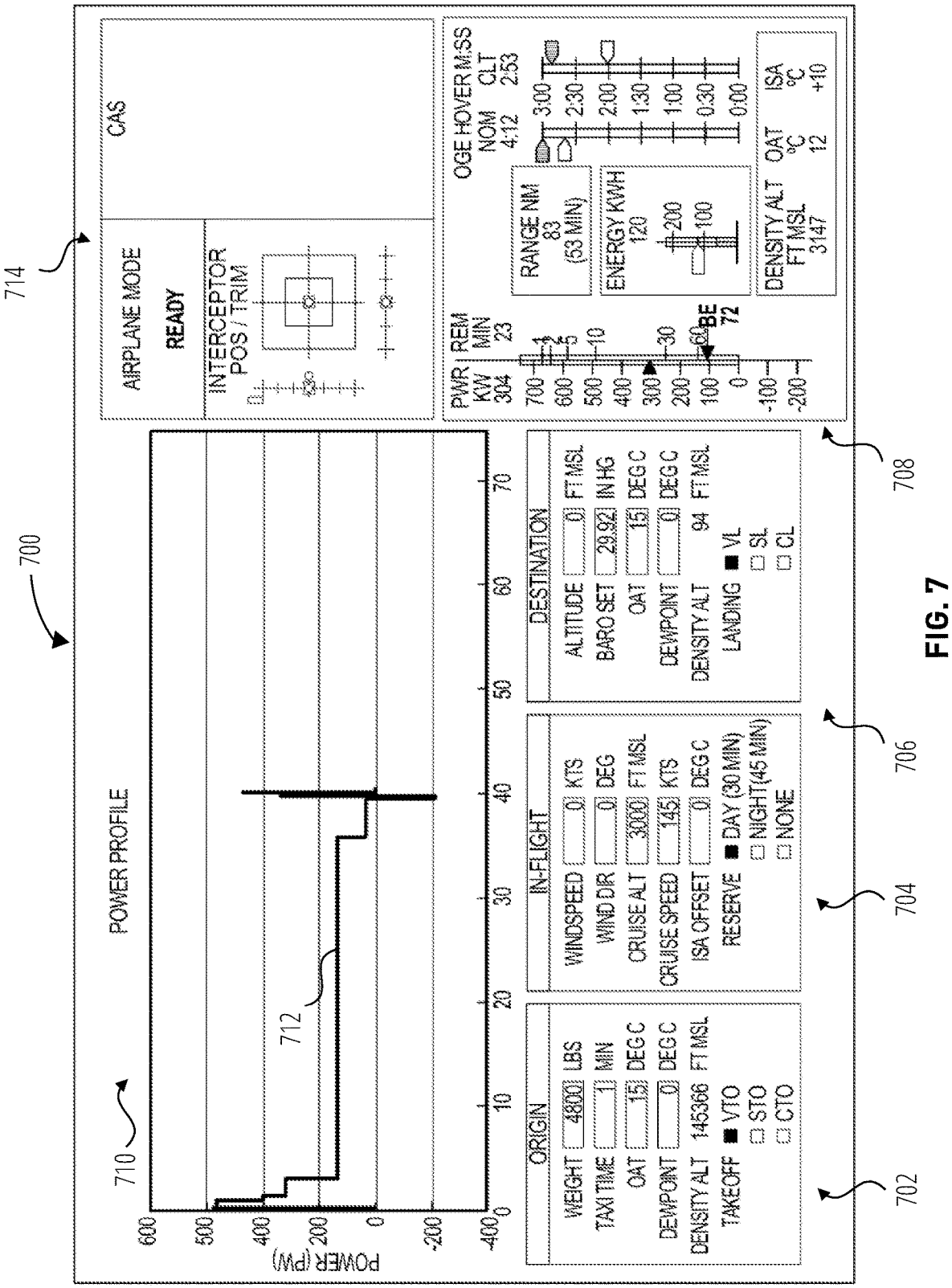
FIG. 7 illustrates a user interface display according to some examples.

FIG. 7 illustrates a user interface display according to some examples. The user interface 700 is provided to the pilot for use in preparing to fly and while flying the aircraft 100. In the user interface 700, battery health and state have been abstracted so that all the pilot sees is the capability of the aircraft 100. The battery health, age and other factors are considered in the battery models 504. For the same mission, an older battery pack would indicate less range and time remaining than a new battery. The user interface 700 allows the pilot to make decisions without concern about the nature, age, raw capacity or status of the energy storage system 200.

At the bottom left of the user interface 700 are displays showing flight plan parameters that are entered by the pilot, or are automatically retrieved in advance of the flight (and verified by the pilot) over the network 414 from a data repository 410 based on the location of the aircraft 100, which is determined for example by GPS coordinates derived from a GPS receiver located in the aircraft 100. The flight plan parameters are generally static or can be considered to be so for the purposes of the flight plan, although they can be updated by the pilot or automatically over the network 414 as the flight progresses. Illustrated are an origin parameter display 702, an in-flight parameter display 704 and a destination parameter display 706.

In the illustrated user interface 700, the origin parameter display 702, the in-flight parameter display 704 and the destination parameter display 706 do not have identified locations of origin and destination, just inputs for or values of the parameters at the destination and origin and what the pilot intends to do, such as the type of takeoff and landing and the intended cruise altitude and cruise speed. This provides an input of only the required parameters. In some alternative examples, location information for the origin and destination may also be provided.

In the examples shown, the origin parameter display 702 includes an aircraft weight, an intended taxi time, an outside air temperature (OAT), the dewpoint temperature, a density altitude above mean sea level (MSL), and whether the takeoff is going to be vertical (VTO), short (STO) or conventional (CTO).

The in-flight parameter display 704 includes a wind speed and direction, an intended cruise altitude, an intended cruise speed, an International Standard Atmosphere (ISA) temperature offset, and three reserve flight-time settings, (i) None, (ii) one for daytime flight and (ii) one for nighttime flight.

The destination parameter display 706 includes the destination altitude above mean sea level, a barometer setting, an outside air temperature, the dewpoint temperature, a density altitude above mean sea level, and whether the landing is going to be vertical (VL), short (SL) or conventional (CL).

Based on these parameters, a battery model 504 determines a range and remaining flight time for the flight plan as described above, which is displayed in the capability output display 708 discussed in more detail below with reference to FIG. 8. If, at the origin, the range displayed in capability output display 708 is greater than the distance between the origin and destination according to the flight plan, the pilot can proceed with the flight. In some examples this is verified solely by the pilot, while in other examples this is verified by the electrical architecture 302 or one of the systems in the computing environment 400. In such a case the aircraft 100 may be disabled until a flight plan is provided that is achievable.

In some examples, a flight time reserve capability is included in the parameters used by the battery model 504 for the pre-flight determination of the range and remaining flight time. The reserve capability may be required by regulation, and may vary by time of day, such as for example 30 minutes of reserve flight time for a daytime flight and 45 minutes of reserve flight time for a nighttime flight. In such a case, the battery model 504 may obtain the local time of day and date and determine whether the departure time or estimated arrival time falls within what is deemed to be nighttime. In such a case, the more conservative nighttime value will be used in the determination by the battery model 504 of the range and remaining flight time for the flight plan.

Depending on the implementation, the display of the range and remaining flight time may or may not include the reserve capability prior to takeoff. It may be easier and more convenient for the pilot to assess the flight plan if the reserve capability is not included in the pre-flight display. However, once the flight has commenced, the range and remaining flight time displays will include the reserve capability, so that the actual capabilities of the aircraft 100 are shown.

A plot 712 of the estimated power draw versus time for the flight plan that is defined by the parameters in the in-flight parameter display 704, destination parameter display 706 and capability output display 708 is shown in the power profile graph 710. A plot of the actual power draw versus time during the flight can also be shown in the power profile graph 710, likely in a different color to distinguish it from the plot 712 of the estimated power draw. The display of the actual power draw versus the estimated power draw can be used by the pilot to verify that the flight is progressing more or less as planned.

Also included in the user interface 700 is a status display 714, which can include various sub-displays, include an Airplane Mode (Ready, Charging, Standby, and so forth), an inceptor position and trim display, and a crew alerting system (CAS) display.

Figure 8:
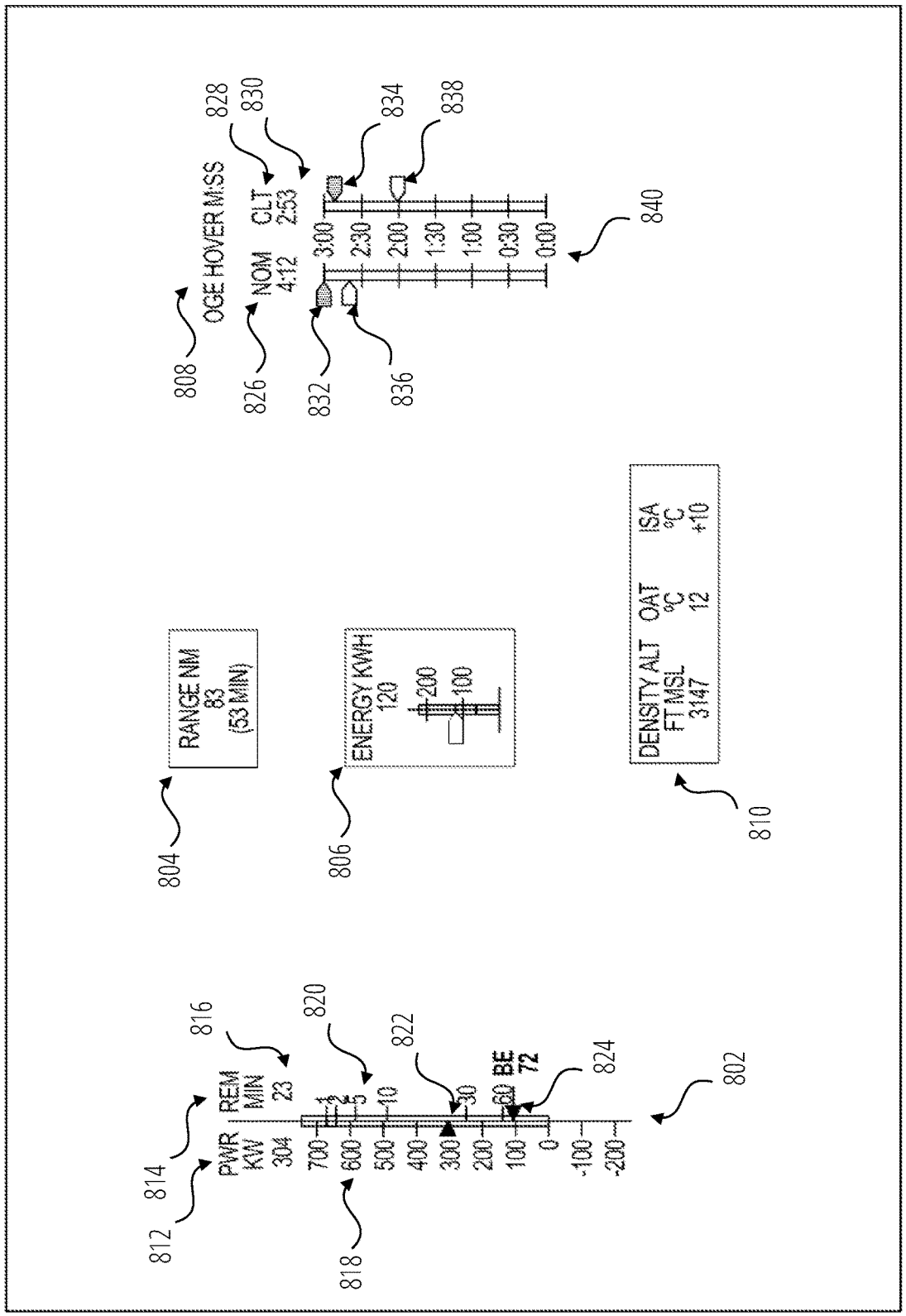
FIG. 8 illustrates the capability output display of the user interface of FIG. 7 in more detail, according to some examples.

FIG. 8 illustrates the capability output display 708 of the user interface 700 of FIG. 7 in more detail, according to some examples. The elements of the capability output display 708 have been spread apart in FIG. 8 for clarity.

On the left-hand side of the figure is a current power capability display 802. The current power capability display 802 includes a column showing values 818 for current power and a column showing values 820 for the corresponding remaining minutes 814 in the current flight mode (vertical flight or forward flight). Each of the values 820 shown in the remaining minutes 814 display corresponds to the adjacent value in the current power 812 display. Accordingly, the current power capability display 802 gives at a glance what the aircraft 100 is capable of for any of the power levels, irrespective of the actual power level. For example, if the power draw was to be 500 kW then it can easily be seen that there would be just under ten minutes of available flight time, while at approximately 650 kW there would be approximately 2 minutes of available flight time.

The values 820 in the remaining minutes 814 display may be arranged on a logarithmic or other nonlinear scale, or more values may be provided for shorter remaining times, so that the more critical shorter flight times are more prominently visible. As illustrated, three time values (5, 2 and 1) less than ten minutes are shown but only two values (30 and 60) greater than ten minutes are shown. Also shown are numerical values 816 for the current power draw and the corresponding remaining minutes of flight time.

The current (actual) power draw is indicated on the current power capability display 802 by means of a current power draw pointer 822. This pointer will move up and down on the current power capability display 802 as the power varies throughout the flight. The current power draw pointer 822 indicates both the current power draw and the corresponding number of minutes of available flight time remaining, and corresponds to the numerical values 816 shown above. Also shown on the current power capability display 802 is a BE power draw pointer 824, which marks the best endurance power level and corresponding remaining minutes, and includes a numerical value corresponding to the BE remaining number of minutes.

The capability output display 708 also includes a current range output 804, which provides a range in nautical miles and the corresponding number of minutes of flight time. The values in the current range output 804 are based on the (remaining) flight profile, while the remaining minutes indicated by the current power draw pointer 822 is based on the current power consumption.

Also included is a battery level output 806, which is a "fuel tank" that indicates current battery level. As noted previously, the available energy in the battery does not normally correspond to an available capability, since the latter depends on a number of factors (including the battery level), such as battery temperature and voltage level. An ambient conditions display 810 provides current conditions, including density altitude, outside air temperature and an ISA temperature adjustment.

A hover capability display 808 provides a display of nominal hover time 826 and CLT hover time 828. Nominal hover time is based on all systems of the aircraft 100, working nominally, while a critical loss of thrust (CLT) hover time is based on a worst-case battery failure or worst-case motor failure that would degrade aircraft performance. The aircraft 100 cannot be operated vertically unless there is a predetermined minimum amount of available hover time (such as 10, 20, 30, 60, 120, or any suitable or required number of seconds) to ensure a safe vertical landing in the event of a critical loss of thrust, given the variability of the flight profile. The pilot is not permitted to engage vertical flight mode and is required to land the aircraft 100 conventionally if the available CLT hover time 828 is less than the predetermined minimum amount of available hover time.

Numerical values 830 for available hover time for nominal and CLT conditions, at the current ambient conditions, are shown in the hover capability display 808. Also shown is a column 840 of hover times. Two nominal and two CLT hover times are indicated in the column 840. The two greyed out pointers indicate the available hover times at conditions at the destination, which is where the aircraft 100 is likely to go into a vertical flight mode for landing. Shown is a destination conditions pointer 832 for nominal hover time and a destination conditions pointer 834 for CLT hover time. Current conditions pointer 836 indicates the nominal hover time for the current conditions, while current conditions pointer 838 indicates CLT hover time for the current conditions.

To ensure sufficient resolution for available hover times less than three minutes, the values in column 840 top out at three minutes. Any hover value greater than three minutes is indicate as three minutes by the corresponding pointer. As can be seen in the example shown in FIG. 8, the destination conditions pointer 832 for nominal hover thus shows three minutes while the actual amount as indicated by the nominal value in the numerical values 830 is 4:12.

Figure 9:
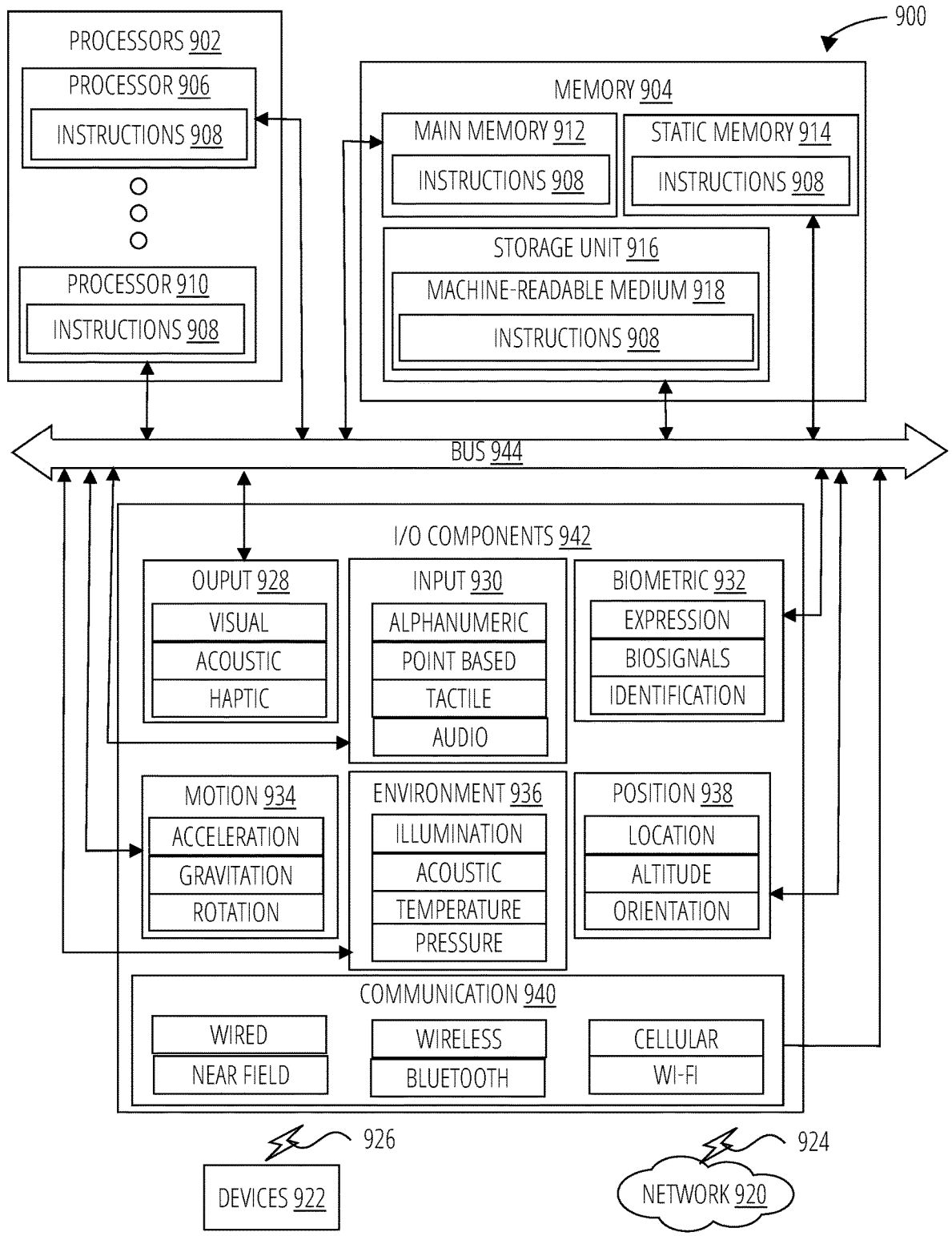
FIG. 9 illustrates a diagrammatic representation of a machine in the form of a computer system within which a set of instructions may be executed for causing the machine to perform any one or more of the methodologies discussed herein, according to some examples

FIG. 9 illustrates a diagrammatic representation of a machine 900 in the form of a computer system within which a set of instructions may be executed for causing the machine to perform any one or more of the methodologies discussed herein, according to an example. Specifically, FIG. 9 shows a diagrammatic representation of the machine 900 in the example form of a computer system, within which instructions 908 (e.g., software, a program, an application, an applet, an app, or other executable code) for causing the machine 900 to perform any one or more of the methodologies discussed herein may be executed. The instructions 908 transform the general, non-programmed machine 900 into a particular machine 900 programmed to carry out the described and illustrated functions in the manner described. In alternative examples, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines 900 that individually or jointly execute the instructions 908 to perform any one or more of the methodologies discussed herein.

The machine 900 may include processors 902, memory 904, and I/O components 942, which may be configured to communicate with each other such as via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that may execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 may include a main memory 912, a static memory 914, and a storage unit 916, both accessible to the processors 902 such as via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the processor's cache memory), or any suitable combination thereof, during execution thereof by the machine 900.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones will likely include a touch input device or other such input mechanisms, while a headless server machine will likely not include such a touch input device. It will be appreciated that the I/O components 942 may include many other components that are not shown in FIG. 9. The I/O components 942 are grouped according to functionality merely for simplifying the following discussion and the grouping is in no way limiting. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 may include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., memory 904, main memory 912, static memory 914, and/or memory of the processors 902) and/or storage unit 916 may store one or more sets of instructions and data structures (e.g., software) embodying or utilized by any one or more of the methodologies or functions described herein. These instructions (e.g., the instructions 908), when executed by processors 902, cause various operations to implement the disclosed examples.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various examples, one or more portions of the network 920 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 920 or a portion of the network 920 may include a wireless or cellular network, and the coupling 924 may be a Code Division Multiple Access (CDMA) connection, a Global System for Mobile communications (GSM) connection, or another type of cellular or wireless coupling. In this example, the coupling 924 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 908 may be transmitted or received over the network 920 using a transmission medium via a network interface device (e.g., a network interface component included in the communication components 940) and utilizing any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 908 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

examples of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the examples of the invention disclosed herein without departing from the scope of this invention defined in the following claims.

What is claimed is:

1. A method, executed by one or more processors, comprising:
   accessing status values representing a current state of an energy storage system in an aircraft, including an available energy level, a voltage level, and a battery temperature value;
   accessing demand values related to expected power demands on the energy storage system;
   executing a dynamic model to compute an ongoing status of the energy storage system using the status values and the demand values to predict when the available energy level will reach an energy level threshold value;
   executing the dynamic model to compute an ongoing status of the energy storage system using the status values and the demand values to predict when the voltage level will reach a voltage threshold value;
   executing the dynamic model to compute an ongoing status of the energy storage system using the status values and the demand values to predict when the battery temperature value will reach a temperature threshold value; and
   providing an output of a predicted capability of the aircraft based on a status of the energy storage system when the first one of the available energy level, a voltage level, and a battery temperature value is predicted to reach its corresponding threshold value.

2. The method of claim 1 wherein the demand values are based in part on a type of flight including forward flight and vertical flight.

3. The method of claim 1 wherein execution of the dynamic model is done iteratively to determine a sequence of predicted status values representing predicted states of the energy storage system based on the expected power demands on the energy storage system.

4. The method of claim 1 wherein the demand values are related to a flight plan including a takeoff, a flight path and a landing.

5. The method of claim 1 further comprising:
   executing a second dynamic model to compute a second ongoing status of the energy storage system using the status values and one or more alternative demand values to predict when a particular one of the status values will first reach a threshold value; and
   providing an output of an alternative predicted capability of the aircraft based on the particular status value first reaching the threshold value based on the one or more alternative demand values.

6. The method of claim 5 wherein an alternative demand value is based on hovering of the aircraft.

7. The method of claim 5 wherein an alternative demand value is a power level that will provide an approximate maximum range.

8. The method of claim 5 wherein an alternative demand value is based on a loss of a capability of the aircraft.

9. The method of claim 8 wherein the energy storage system comprises a plurality of energy storage modules and the loss of the capability of the aircraft is a loss of power from one of the energy storage modules.

10. The method of claim 8 wherein the aircraft comprises a plurality of thrust-generating modules and the loss of the capability of the aircraft is a loss of thrust from one of the thrust-generating modules.

11. A computer system comprising:
    one or more processors; and
    a memory storing instructions that, when executed by the one or more processors, configure the system to perform operations comprising:
    accessing status values representing a current state of an energy storage system in an aircraft, including an available energy level, a voltage level, and a battery temperature value;
    accessing demand values related to expected power demands on the energy storage system;
    executing a dynamic model to compute an ongoing status of the energy storage system using the status values and the demand values to predict when the available energy level will reach an energy level threshold value;
    executing the dynamic model to compute an ongoing status of the energy storage system using the status values and the demand values to predict when the voltage level will reach a voltage threshold value;
    executing the dynamic model to compute an ongoing status of the energy storage system using the status values and the demand values to predict when the battery temperature value will reach a temperature threshold value; and
    providing an output of a predicted capability of the aircraft based on a status of the energy storage system when the first one of the available energy level, a voltage level, and a battery temperature value is predicted to reach its corresponding threshold value.

12. The computer system of claim 11 wherein execution of the dynamic model is done iteratively to determine a sequence of predicted status values representing predicted states of the energy storage system based on the expected power demands on the energy storage system.

13. The computer system of claim 11 wherein the operations further comprise:
    executing a second dynamic model to compute a second ongoing status of the energy storage system using the status values and one or more alternative demand values to predict when a particular one of the status values will first reach a threshold value; and
    providing an output of an alternative predicted capability of the aircraft based on the particular status value first reaching the threshold value based on the one or more alternative demand values.

14. The computer system of claim 13 wherein an alternative demand value is based on a loss of a capability of the aircraft.

15. A non-transitory computer-readable storage medium, the computer-readable storage medium including instructions that when executed by one or more processors, cause the processors to perform operations comprising:
    accessing status values representing a current state of an energy storage system in an aircraft, including an available energy level, a voltage level, and a battery temperature value;
    accessing demand values related to expected power demands on the energy storage system;
    executing a dynamic model to compute an ongoing status of the energy storage system using the status values and the demand values to predict when the available energy level will reach an energy level threshold value;
    executing the dynamic model to compute an ongoing status of the energy storage system using the status values and the demand values to predict when the voltage level will reach a voltage threshold value;
    executing the dynamic model to compute an ongoing status of the energy storage system using the status values and the demand values to predict when the battery temperature value will reach a temperature threshold value; and
    providing an output of a predicted capability of the aircraft based on a status of the energy storage system when the first one of the available energy level, a voltage level, and a battery temperature value is predicted to reach its corresponding threshold value.

16. The non-transitory computer-readable storage medium of claim 15 wherein execution of the dynamic model is done iteratively to determine a sequence of predicted status values representing predicted states of the energy storage system based on the expected power demands on the energy storage system.

17. The non-transitory computer-readable storage medium of claim 16 wherein the operations further comprise:
    executing a second dynamic model to compute a second ongoing status of the energy storage system using the status values and one or more alternative demand values to predict when a particular one of the status values will first reach a threshold value; and
    providing an output of an alternative predicted capability of the aircraft based on the particular status value first reaching the threshold value based on the one or more alternative demand values.

18. The non-transitory computer-readable storage medium of claim 17 wherein an alternative demand value is a power level that will provide an approximate maximum range.

19. The non-transitory computer-readable storage medium of claim 17 wherein an alternative demand value is based on a loss of a capability of the aircraft.

20. The non-transitory computer-readable storage medium of claim 19 wherein the energy storage system comprises a plurality of energy storage modules and the loss of the capability of the aircraft is a loss of power from one of the energy storage modules.

* * * * *